United States Patent
Shabi et al.

(10) Patent No.: US 12,001,704 B2
(45) Date of Patent: Jun. 4, 2024

(54) SYSTEM AND METHOD FOR DETECTING AND UTILIZING DATA PATTERNS

(71) Applicant: Dell Products, L.P., Round Rock, TX (US)

(72) Inventors: Uri Shabi, Tel Mond (IL); Aleksey Kabishcer, Marlborough, MA (US); Nir Bar Joseph, Giv'atayim (IL)

(73) Assignee: Dell Products L.P., Round Rock, TX (US)

( * ) Notice: Subject to any disclaimer, the term of this patent is extended or adjusted under 35 U.S.C. 154(b) by 109 days.

(21) Appl. No.: 17/887,662

(22) Filed: Aug. 15, 2022

(65) Prior Publication Data

US 2024/0053912 A1    Feb. 15, 2024

(51) Int. Cl.
  *G06F 12/00*    (2006.01)
  *G06F 3/06*    (2006.01)
  *G06F 12/0815*    (2016.01)

(52) U.S. Cl.
  CPC .......... *G06F 3/0641* (2013.01); *G06F 3/0608* (2013.01); *G06F 12/0815* (2013.01)

(58) Field of Classification Search
  None
  See application file for complete search history.

(56) References Cited

U.S. PATENT DOCUMENTS

| | | | |
|---|---|---|---|
| 2013/0282960 A1* | 10/2013 | Kannappan | G06F 12/0246 711/E12.008 |
| 2017/0249105 A1* | 8/2017 | Yang | G06F 3/0608 |
| 2018/0349053 A1* | 12/2018 | Battaje | G06F 12/0891 |

* cited by examiner

*Primary Examiner* — Daniel D Tsui
(74) *Attorney, Agent, or Firm* — Brian J. Colandreo; Heath M. Sargeant; Holland & Knight LLP (57) ABSTRACT

A method, computer program product, and computing system for loading a first chunk of data from a user data page into a first buffer. Each successive chunk of data from the user data page may be iteratively loaded into a second buffer. The first chunk of data in the first buffer may be iteratively compared with each successive chunk of data in the second buffer. In response to determining that the first chunk of data in the first buffer is equivalent to each successive chunk of data in the second buffer, the first chunk of data may be defined as a pattern.

20 Claims, 7 Drawing Sheets

SYSTEM AND METHOD FOR DETECTING AND UTILIZING DATA PATTERNS

BACKGROUND

Storing and safeguarding electronic content may be beneficial in modern business and elsewhere. Accordingly, various methodologies may be employed to protect and distribute such electronic content.

In many storage systems, data patterns may be detected and stored only as metadata without actual data storage to save physical space and for faster access. However, the most common approaches are either to compare data to predefined pattern, or to check the hash of the data for a pattern match, but this requires full data comparison in order to obtain complete pattern detection accuracy.

SUMMARY OF DISCLOSURE

In one example implementation, a computer-implemented method executed on a computing device may include, but is not limited to, loading a first chunk of data from a user data page into a first buffer. Each successive chunk of data from the user data page may be iteratively loaded into a second buffer. The first chunk of data in the first buffer may be iteratively compared with each successive chunk of data in the second buffer. In response to determining that the first chunk of data in the first buffer is equivalent to each successive chunk of data in the second buffer, the first chunk of data may be defined as a pattern.

One or more of the following example features may be included. The second buffer may be configured to perform a hash calculation on the successive chunk of data. Iteratively comparing the first chunk of data in the first buffer with the successive chunk of data in the second buffer may include performing an XOR operation on the first chunk of data in the first buffer and the successive chunk of data in the second buffer. Iteratively comparing the first chunk of data in the first buffer with the successive chunk of data in the second buffer may include performing an OR operation on the results of the XOR operation. In response to defining the first chunk of data as a pattern, the size of the first chunk of data may be reduced to a predefined metadata size. A representation of the user data page may be stored using the pattern. A read request for the user data page may be received. The user data page may be reconstructed using the stored representation of the user data page. The reconstructed user data page may be provided in response to the read request.

In another example implementation, a computer program product resides on a computer readable medium that has a plurality of instructions stored on it. When executed by a processor, the instructions cause the processor to perform operations that may include, but are not limited to, loading a first chunk of data from a user data page into a first buffer. Each successive chunk of data from the user data page may be iteratively loaded into a second buffer. The first chunk of data in the first buffer may be iteratively compared with each successive chunk of data in the second buffer. In response to determining that the first chunk of data in the first buffer is equivalent to each successive chunk of data in the second buffer, the first chunk of data may be defined as a pattern.

One or more of the following example features may be included. The second buffer may be configured to perform a hash calculation on the successive chunk of data. Iteratively comparing the first chunk of data in the first buffer with the successive chunk of data in the second buffer may include performing an XOR operation on the first chunk of data in the first buffer and the successive chunk of data in the second buffer. Iteratively comparing the first chunk of data in the first buffer with the successive chunk of data in the second buffer may include performing an OR operation on the results of the XOR operation. In response to defining the first chunk of data as a pattern, the size of the first chunk of data may be reduced to a predefined metadata size. A representation of the user data page may be stored using the pattern. A read request for the user data page may be received. The user data page may be reconstructed using the stored representation of the user data page. The reconstructed user data page may be provided in response to the read request.

In another example implementation, a computing system includes at least one processor and at least one memory architecture coupled with the at least one processor, wherein the at least one processor is configured to loading a first chunk of data from a user data page into a first buffer. Each successive chunk of data from the user data page may be iteratively loaded into a second buffer. The first chunk of data in the first buffer may be iteratively compared with each successive chunk of data in the second buffer. In response to determining that the first chunk of data in the first buffer is equivalent to each successive chunk of data in the second buffer, the first chunk of data may be defined as a pattern.

One or more of the following example features may be included. The second buffer may be configured to perform a hash calculation on the successive chunk of data. Iteratively comparing the first chunk of data in the first buffer with the successive chunk of data in the second buffer may include performing an XOR operation on the first chunk of data in the first buffer and the successive chunk of data in the second buffer. Iteratively comparing the first chunk of data in the first buffer with the successive chunk of data in the second buffer may include performing an OR operation on the results of the XOR operation. In response to defining the first chunk of data as a pattern, the size of the first chunk of data may be reduced to a predefined metadata size. A representation of the user data page may be stored using the pattern. A read request for the user data page may be received. The user data page may be reconstructed using the stored representation of the user data page. The reconstructed user data page may be provided in response to the read request.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
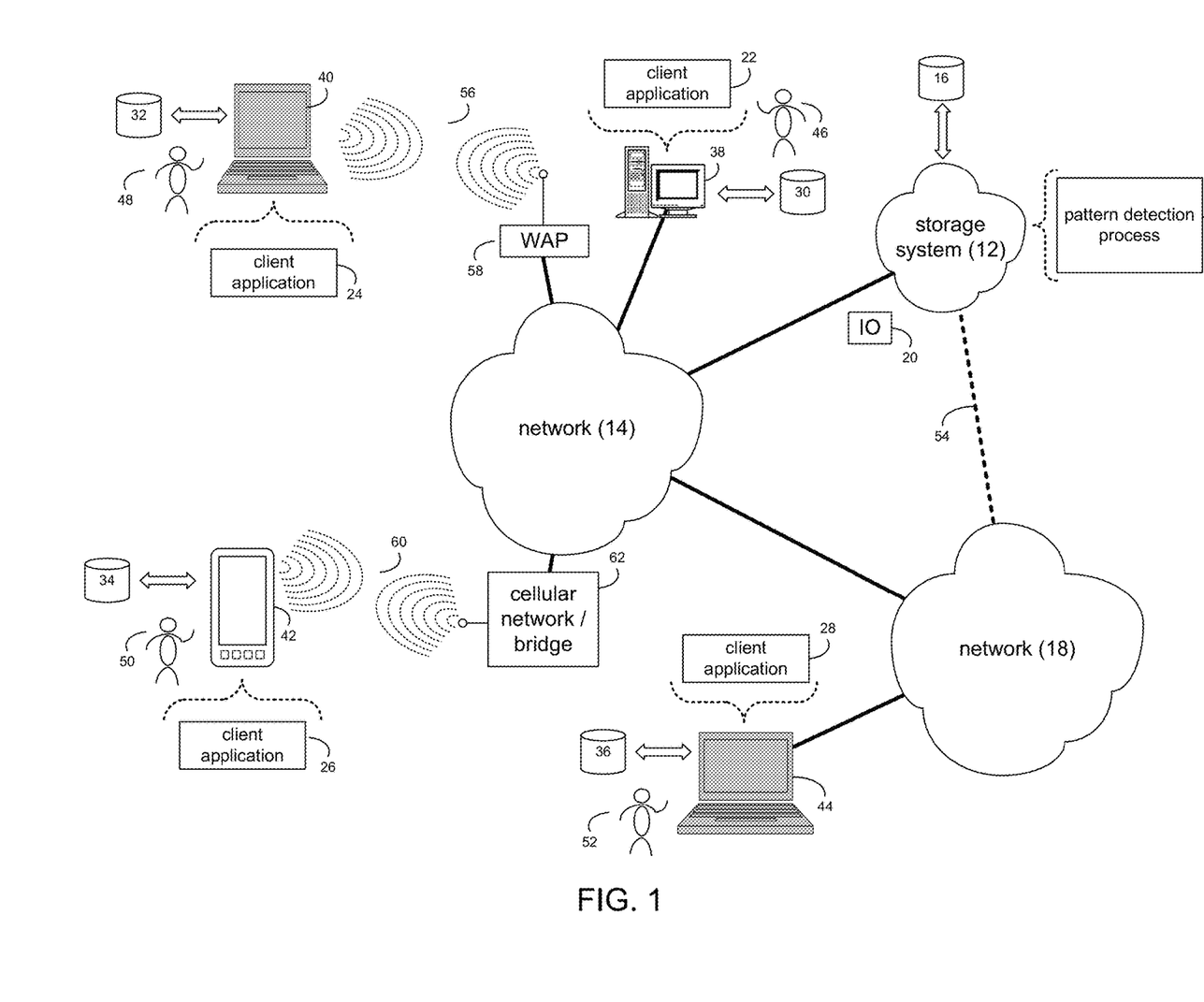
FIG. 1 is an example diagrammatic view of a storage system and a pattern detection process coupled to a distributed computing network according to one or more example implementations of the disclosure.

System Overview:

Referring to FIG. 1, there is shown pattern detection process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of pattern detection process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of pattern detection process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a pattern detection process, such as pattern detection process 10 of FIG. 1, may include but is not limited to, loading a first chunk of data from a user data page into a first buffer. Each successive chunk of data from the user data page may be iteratively loaded into a second buffer. The first chunk of data in the first buffer may be iteratively compared with each successive chunk of data in the second buffer. In response to determining that the first chunk of data in the first buffer is equivalent to each successive chunk of data in the second buffer, the first chunk of data may be defined as a pattern.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
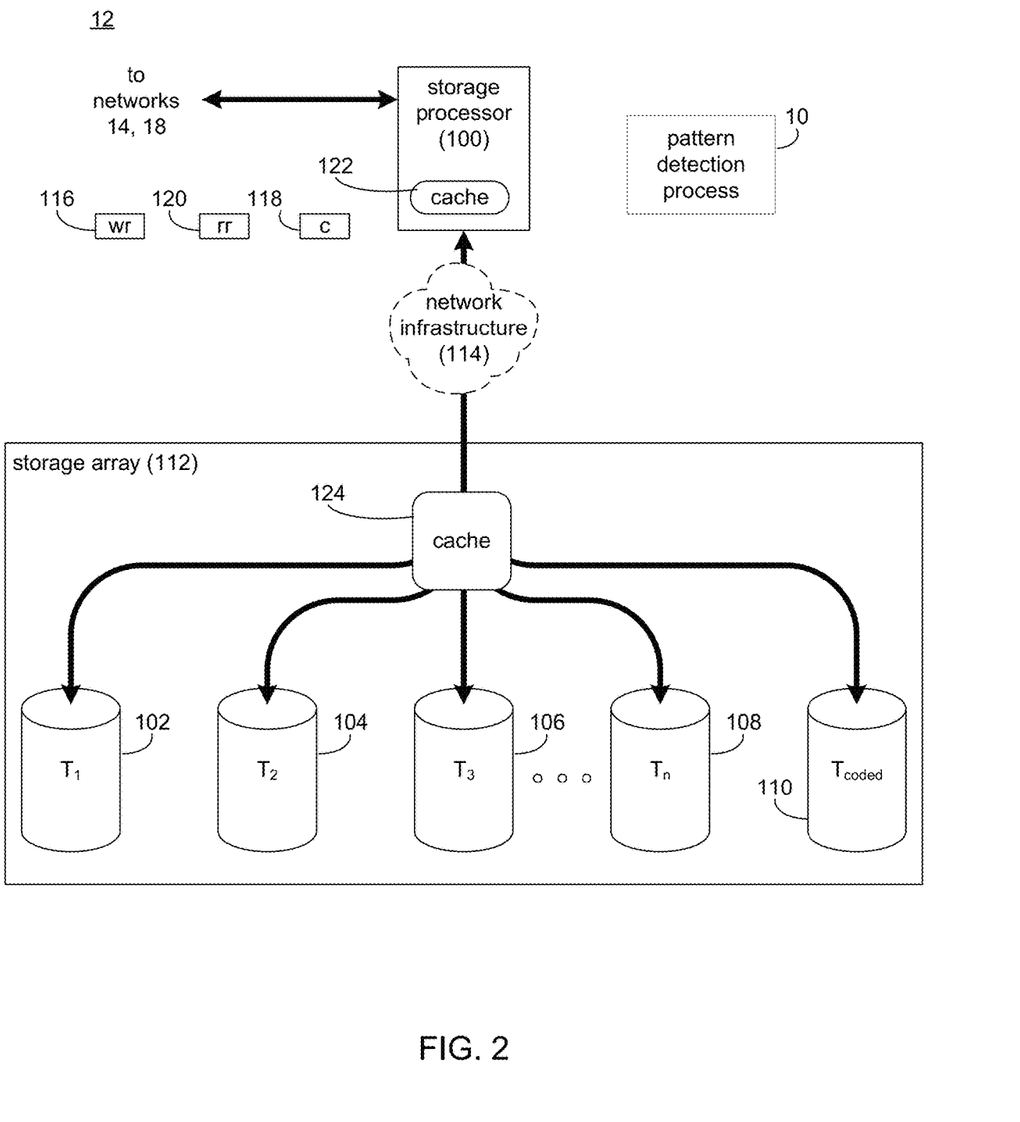
FIG. 2 is an example diagrammatic view of the storage system of FIG. 1 according to one or more example implementations of the disclosure.
Figure 3:
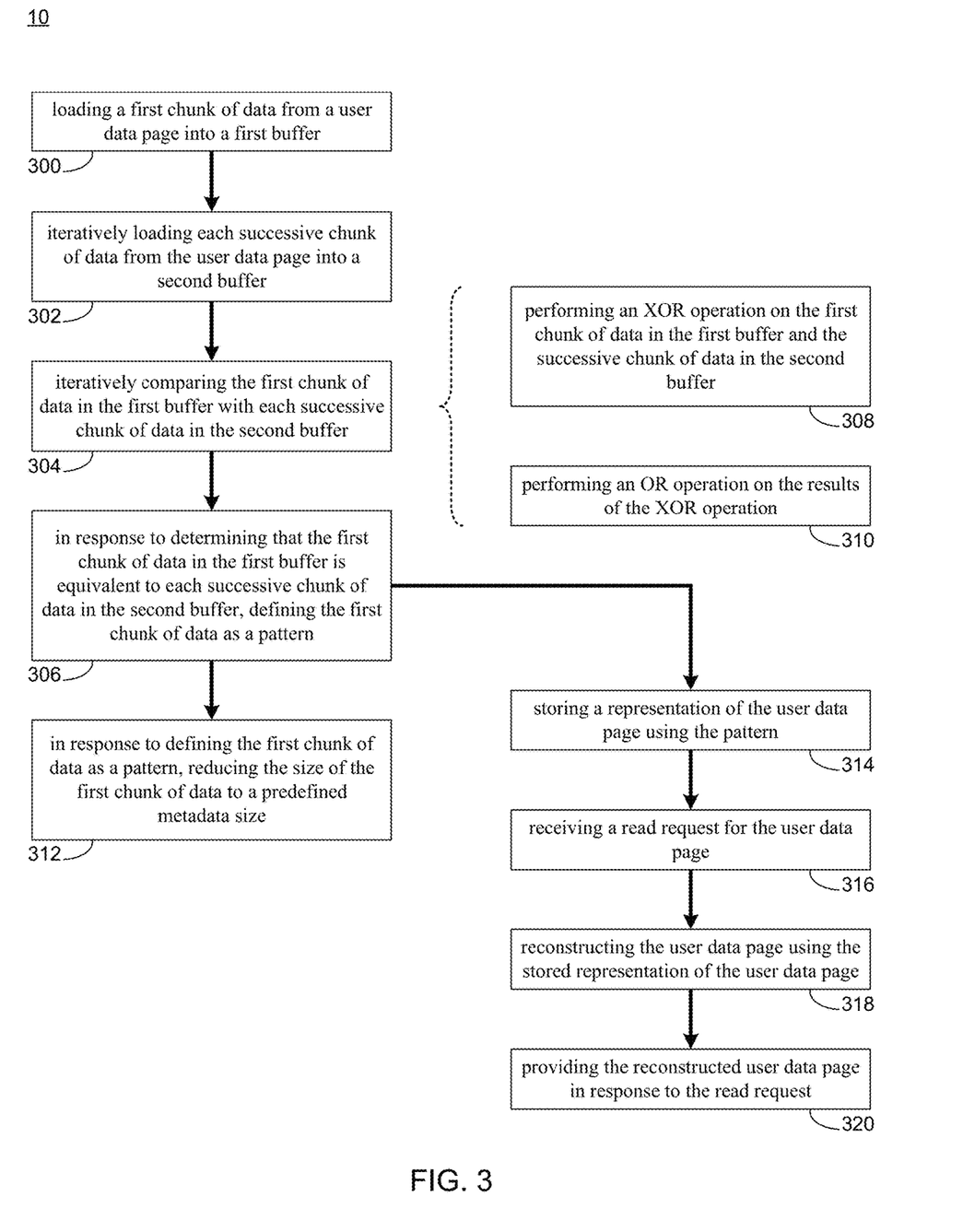
FIG. 3 is an example flowchart of pattern detection process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form storage array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of pattern detection process 10. The instruction sets and subroutines of pattern detection process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of pattern detection process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to storage array 112 (if frontend cache memory system 122 is configured as a write-through cache) or may subsequently write content 118 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of storage array 112, content 118 to be written to storage array 112 may be received from storage processor 100. Storage array 112 may initially store content 118 within backend cache memory system 124 prior to being stored on e.g. one or more of storage targets 102, 104, 106, 108, and coded target 110.

As discussed above, the instruction sets and subroutines of pattern detection process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of pattern detection process 10 may be executed by one or more processors (not shown) and one or more memory architectures (not shown) included within storage array 112.

Further and as discussed above, during the operation of storage array 112, content (e.g., content 118) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).
The Pattern Detection Process:

Referring also to the examples of FIGS. 3-7 and in some implementations, pattern detection process 10 may load 300 a first chunk of data from a user data page into a first buffer. Each successive chunk of data from the user data page may be iteratively loaded 302 into a second buffer. The first chunk of data in the first buffer may be iteratively compared 304 with each successive chunk of data in the second buffer. In response to determining that the first chunk of data in the first buffer is equivalent to each successive chunk of data in the second buffer, the first chunk of data may be defined 306 as a pattern.

As will be discussed in greater detail below, implementations of the present disclosure may allow for arbitrary data pattern detection during user data storage that is integrated with conventional page hash calculation. As discussed above, in many storage systems, data patterns may be detected and stored only as metadata without actual data storage to save physical space and for faster access. However, the most common approaches are either to compare data to predefined pattern, or to check the hash of the data for a pattern match, but this requires full data comparison in order to obtain complete pattern detection accuracy. Accordingly, implementations of the present disclosure allow for the detection of repetitive data patterns as part of the hash calculation process, resulting in equal or faster processing during data hashing while detecting repetitive patterns compared to pre-defined specific patterns.

In some implementations, pattern detection process 10 may load 300 a first chunk of data from a user data page into a first buffer. A chunk of data may include a predefined portion of a user data page. For example, a user data page may be a predefined amount of data used for storing "user data" (i.e., data stored in a storage system during a user's interaction with the storage system). In one example, the user data page may be e.g., 4 kilobytes. However, it will be appreciated that this is for example purposes only as the user data page may be any size within the scope of the present disclosure.

As will be described in greater detail below, pattern detection process 10 may determine whether a user data page includes any patterns to reduce the amount of data required to store the user data page within the storage system. For example, suppose that a user data page includes four identical portions (e.g., 1 kilobyte chunks). In this example, pattern detection process 10 may utilize this pattern to store a representation of the user data page instead of storing four copies of the same data. Pattern detection process 10 may store a single copy of the pattern and metadata indicating that the user data page includes e.g., four copies of the pattern. In this manner, pattern detection process 10 may utilize patterns to improve storage system performance.

As discussed above, conventional approaches to utilizing pattern detection rely on predefined libraries of patterns to compare user data to. However, this approach is limited by the ability to generate and store particular patterns. Additionally, this approach is unable to account for potentially arbitrary patterns that may exist in particular user data pages but not in general data sets. Accordingly, implementations of the present disclosure may utilize portions or chunks of a user data page as candidate patterns for comparison against other portions or chunks of the user data page. In this manner, pattern detection process 10 may utilize the patterns within the user data page to generate representations of the user data page that reduce the amount of storage resources required to store the user data page and other similar user data pages.

Figure 4:
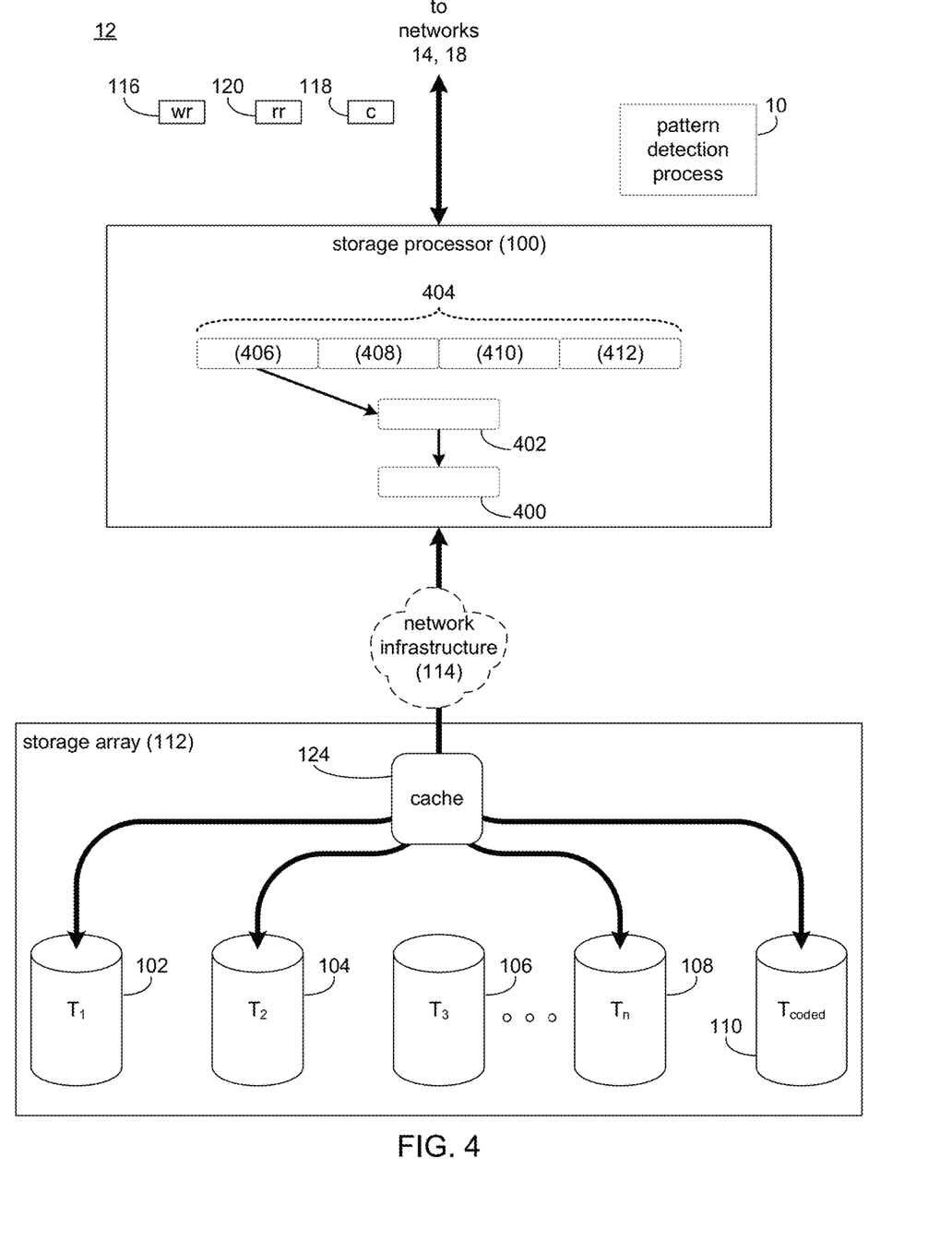
FIGS. 4-7 are example diagrammatic views of the storage system of FIG. 1 according to various example implementations of the disclosure.

In some implementations and as will be discussed in greater detail below, storage processor 100 may include one or more buffers or registers for processing certain portions of data. As is known in the art, a buffer is a data structure configured for temporarily storing data during the processing of the loaded data. For example, storage node 100 may include one or more buffers (e.g., buffers 400, 402). In some implementations, buffer 402 may be configured for storing data while a hash calculation is performed. For example, pattern detection process 10 may load a portion or chunk of data from a user data page for performing a hash calculation. In one example, pattern detection process 10 may generate a hash calculation or representation of a user data page for use in a persistent data log. However, it will be appreciated that hash calculations or representations may be generated and utilized for various purposes within the scope of the present disclosure.

As is known in the art, the process of loading and unloading data from a buffer requires storage processing resources. Pattern detection process 10 may improve the functioning of the storage system by reducing the number of buffer loading and unloading operations. Specifically and as will be discussed in greater detail below, pattern detection process 10 may utilize a predefined or preexisting buffer (e.g., buffer 402) that is configured for generating the hash calculation or representation of a user data page, to compare against a candidate pattern chunk of the user data page. In this manner, pattern detection process 10 may avoid creating additional buffers that would be subject to more loading and unloading operations, and, therefore, additional storage system resources.

Referring also to FIG. 4, storage processor 100 may receive a user data page (e.g., user data page 404) for storing in storage array 112. For example, pattern detection process 10 may receive a write request (e.g., write request 116) with content 118 for storing in storage array 112. In some implementations, pattern detection process 10 may load 300 a portion or chunk of user data page 404 (e.g., first chunk 406) into a first buffer (e.g., first buffer 400). Specifically, pattern detection process 10 may load 300 first chunk 406 into a second buffer (e.g., second buffer 402). The second buffer (e.g., second buffer 402) may be a predefined buffer or register configured to perform a hash calculation on the loaded data. In some implementations, pattern detection process 10 may initially load first chunk 406 into second buffer 402 in order to generate a hash calculation as discussed above. However, it will be appreciated that pattern detection process 10 may perform any type of operation on first data within the scope of the present disclosure.

In some implementations, pattern detection process 10 may, before performing any operations on first chunk 406, copy first chunk 406 to the first buffer (e.g., first buffer 400). First buffer 400 may be a register or other data structure configured for comparing with the data from second buffer 402. For example and as will be discussed in greater detail below, pattern detection process 10 may load 300 first chunk 406 into first buffer 400 in order to iteratively compare first chunk 406 each successive chunk (e.g., chunks 408, 410, 412) of user data page 404 to determine whether first chunk 406 indicates a pattern in user data page 404. In this manner, first chunk 406 may be a candidate pattern for user data page 404. As shown in FIG. 4, pattern detection process 10 may load 300 first chunk 406 from user data page 404 into second buffer 402 and then subsequently into first buffer 400, or directly into first buffer 400. As will be discussed in greater detail below, pattern detection process 10 may utilize first buffer 400 for comparing first chunk 406 to iteratively compare each successive chunk of user data page 404 loaded into second buffer 402.

Figure 5:
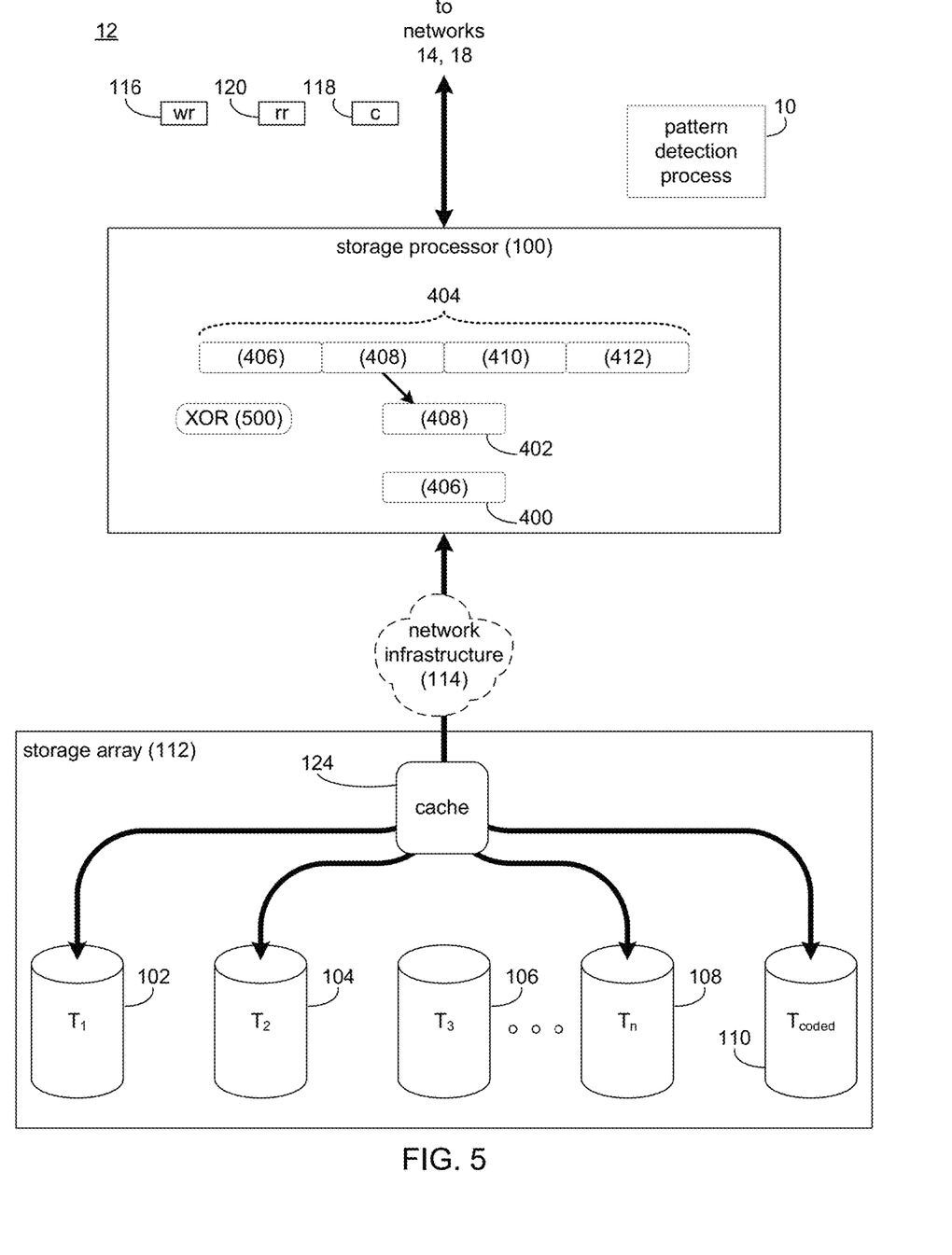

In some implementations, pattern detection process 10 may iteratively load 302 each successive chunk of data from the user data page into a second buffer. For example and as discussed above, user data page 404 may include a plurality of chunks (e.g., chunks 406, 408, 410, 412) where each chunk includes a predefined amount of or portion of user data page 404. Referring also to FIG. 5, suppose that user data page 404 includes chunks 406, 408, 410, 412 of which the first chunk is first chunk 406 loaded 300 into first buffer 400. Pattern detection process 10 may iteratively load each successive chunk of data from user data page 404 into second buffer 402. Iteratively loading 302 each successive chunk includes clearing the previous contents of second buffer 402 and loading the next chunk of user data page 404. In the example of FIG. 5, pattern detection process 10 may clear the contents of second buffer 402 and load chunk 408 into second buffer 402.

In some implementations, pattern detection process 10 may iteratively compare 304 the first chunk of data in the first buffer with each successive chunk of data in the second buffer. For example, pattern detection process 10 may utilize first buffer 400 to store the candidate pattern for a user data page and may utilize second buffer 402 to store the next chunk of the user data page to compare with the candidate pattern. As with the iteratively loading of the next or successive chunk of the user data page, pattern detection process 10 may iteratively or successively load and compare the contents of each chunk of the user data page until all chunks have been compared to the candidate pattern.

Iteratively comparing 304 the first chunk of data in the first buffer with the successive chunk of data in the second buffer may include performing 308 an XOR operation on the first chunk of data in the first buffer and the successive chunk of data in the second buffer. For example, with first chunk 406 in first buffer 400 and the next chunk (e.g., chunk 408) in second buffer 402, pattern detection process 10 may compare 304 first chunk 406 and chunk 408 to determine the similarity between the chunks. As is known in the art, an XOR operation (i.e., exclusive logical "or" operation) is a Boolean logic operation that compares two inputs and generates one output bit. If the inputs are the same, the output is "0". If the inputs are different, the output is "1". In one example, suppose that first chunk 406 and chunk 408 each include e.g., 32 bytes. In this example and as shown in FIG. 5, pattern detection process 10 may compare each corresponding byte from first chunk 406 and chunk 408 by performing an XOR operation. The results of the XOR operation may be stored as XOR result 500, which may be an array or vector of XOR operation output bits corresponding to the comparison of each byte of first chunk 406 and chunk 408. While an example of an XOR operation has been described, it will be appreciated that this for example purposes only and that various types of operations may be utilized to compare each chunk within the scope of the present disclosure.

Figure 6:
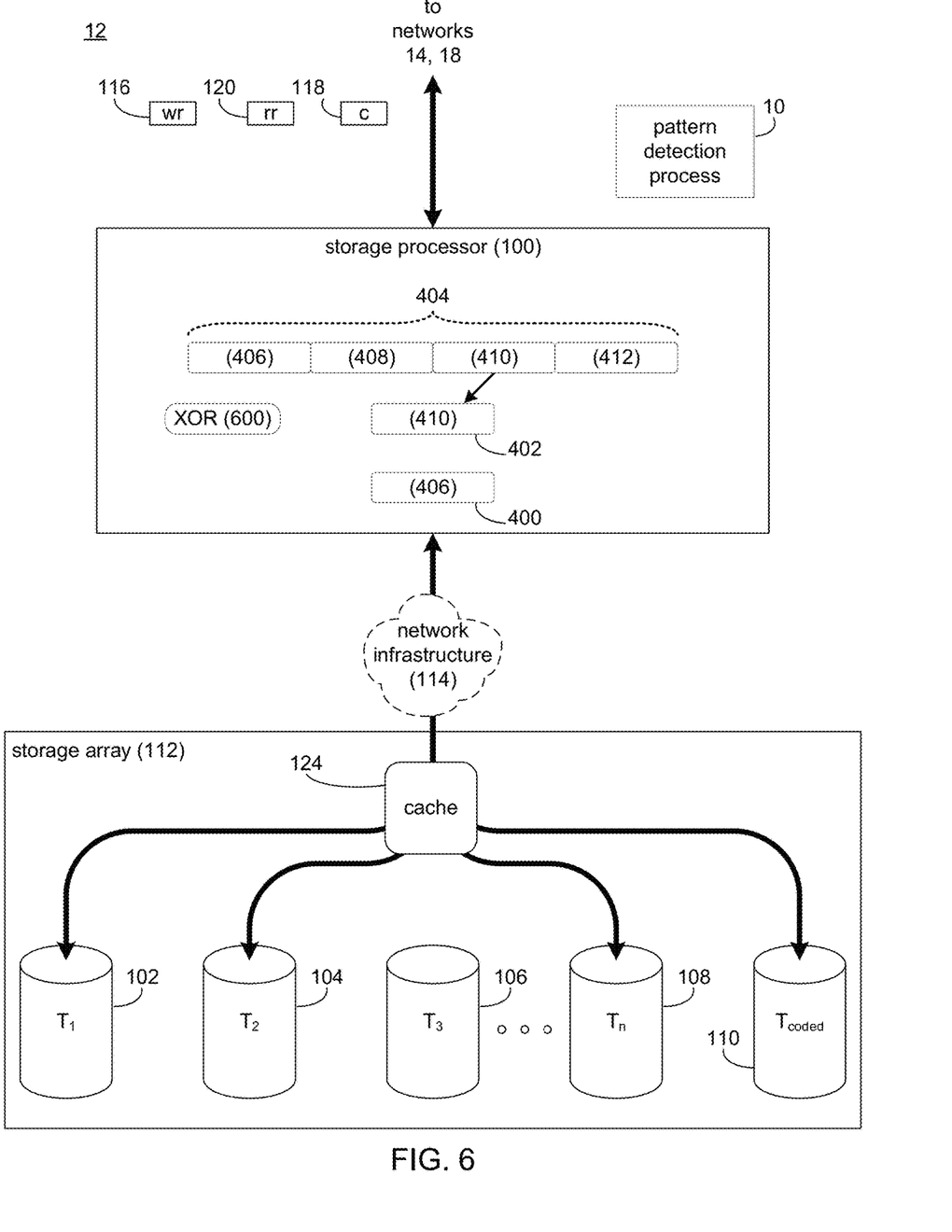
Figure 7:
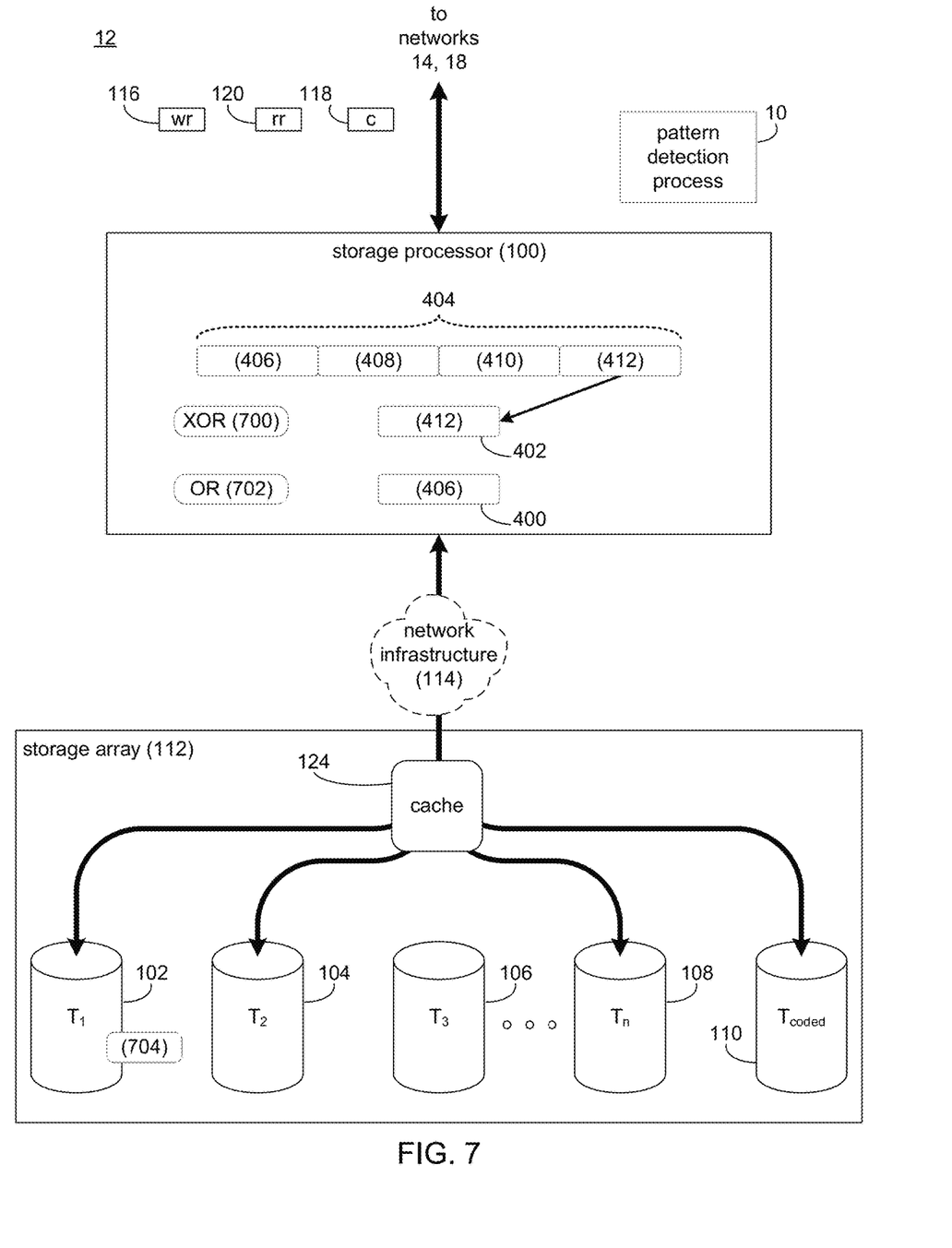

Referring also to FIGS. 6-7, pattern detection process 10 may continue from the example of FIG. 5 by loading 302 chunk 410 into second buffer 402 and comparing 304 chunk 410 to first chunk 406 to generate a comparison result (e.g., XOR result 600). Additionally, pattern detection process 10 may load 302 chunk 412 into second buffer 402 and compare 304 chunk 412 to first chunk 406 to generate a comparison result (e.g., XOR result 700). While the example of FIGS. 5-7 show e.g., four chunks (e.g., chunks 406, 408, 410, 412) within user data page 404, it will be appreciated that this is for example purposes only and that any number of chunks may be iteratively compared within the scope of the present disclosure. Additionally, while the above description indicates successive comparison of chunks to the first chunk, it will be appreciated that pattern detection process 10 may compare the chunks out of order and/or in any predefined sequence within the scope of the present disclosure.

In some implementations, iteratively comparing 304 the first chunk of data in the first buffer with the successive chunk of data in the second buffer includes performing 310 an OR operation on the results of the XOR operation. For example, pattern detection process 10 may determine whether first chunk 406 represents a pattern within user data page 404. As described above, pattern detection process 10 may process each of the XOR results (e.g., XOR results 500, 600, 700) to determine whether first chunk 406 is equivalent to each successive chunk of data in the user data page. In one example, pattern detection process 10 may perform a logical OR operation on the XOR results. For example, if any of the XOR operations yield a "1", then the first chunk is not equivalent to that respective chunk. As such, pattern detection process 10 may perform an OR operation on any number of XOR results to yield OR result 702. If OR result 702 is a "0", then first chunk 406 is equivalent to each of the successive chunks. If OR result is a "1", then first chunk 406 is not equivalent to each of the successive chunks. Further, it will be appreciated that pattern detection process 10 may cease comparing chunks to the first chunk if and when the comparison result indicates that the chunks are not equivalent. For example, pattern detection process 10 may iteratively perform an OR operation on the XOR results as they are generated. If at any point in the processing of a successive chunk, the OR result indicates that the first chunk is not equivalent to a successive chunk, pattern detection process 10 may cease comparing chunks from the user data page. In this example, pattern detection process 10 may store the user data page without pattern information and may then load another first chunk of a new user data page for processing in the manner described above. While an OR operation has been described for determining whether the first chunk is equivalent to each successive chunk, it will be appreciated that this is for example purposes only and that various types of operations may be performed on the comparison information of each successive chunk within the scope of the present disclosure.

In some implementations, pattern detection process 10 may, in response to determining that the first chunk of data in the first buffer is equivalent to each successive chunk of data in the second buffer, define 306 the first chunk of data as a pattern. As discussed above, a pattern may generally include a chunk from a user data page that is repeated within a user data page such that all of the content of the user data page may be represented as the pattern and the number of occurrences of the pattern within the user data page. Referring again to the example of FIG. 7, pattern detection process 10 may, in response to determining that first chunk 406 is first buffer 400 is equivalent to chunks 408, 410, 412, define 306 first chunk 406 as a pattern. As will be discussed in greater detail below, pattern detection process 10 may store the defined pattern for reading the user data page during a read operation.

In some implementations, pattern detection process 10 may, in response to defining the first chunk of data as a pattern, reduce 312 the size of the first chunk of data to a predefined metadata size. For example, suppose first chunk 406 is e.g., 32 bytes but the predefined metadata size is e.g., 8 bytes. In this example, pattern detection process 10 may reduce the pattern of first chunk 406 from e.g., 32 bytes to e.g., 8 bytes by comparing each eight byte chunk together to generate an e.g., 8 byte representation of first chunk 406. While an example of an 8 byte metadata page has been described, it will be appreciated that this is for example purposes only and that any metadata page size may be used within the scope of the present disclosure.

In some implementations, pattern detection process 10 may store a representation of the user data page using the pattern. For example, with a pattern recognized within a user data page, pattern detection process 10 may enhance the storage efficiency of the user data page by generating a representation of the user data page that includes the pattern and the number of instances of the pattern within the user data page. Referring again to the example of FIG. 7, pattern detection process 10 may store 314 a representation of user data page 404 as representation 704 indicating the content of first chunk 406 and the number of iterations of first chunk 406 in user data page 404. In this manner, pattern detection process 10 may avoid saving multiple redundant copies of the same data to the storage system.

In some implementations, pattern detection process 10 may receive 316 a read request for the user data page; reconstruct 348 the user data page using the stored representation of the user data page; and provide 320 the reconstructed user data page in response to the read request. For example, suppose a user desires to obtain user data page 404 from storage system 12. In this example, pattern detection process 10 may receive 316 a read request (e.g., read request 120) for user data page 404. Pattern detection process 10 may obtain the stored representation of user data page 404 (e.g., representation 704) from storage array 112. As representation 704 indicates that user data page 404 includes the data of first chunk 406 repeated four times, pattern detection process 10 may reconstruct 318 user data page 404 and provide 320 the reconstructed user data page (e.g., user data page 404) in response to the read request.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   loading a first chunk of data from a user data page into a first buffer;
   iteratively loading each successive chunk of data from the user data page into a second buffer;
   iteratively comparing the first chunk of data in the first buffer with each successive chunk of data in the second buffer; and
   in response to determining that the first chunk of data in the first buffer is equivalent to each successive chunk of data in the second buffer, defining the first chunk of data as a pattern.

2. The computer-implemented method of claim 1, wherein the second buffer is configured to perform a hash calculation on the successive chunk of data.

3. The computer-implemented method of claim 1, wherein iteratively comparing the first chunk of data in the first buffer with the successive chunk of data in the second buffer includes performing an XOR operation on the first chunk of data in the first buffer and the successive chunk of data in the second buffer.

4. The computer-implemented method of claim 3, wherein iteratively comparing the first chunk of data in the first buffer with the successive chunk of data in the second buffer includes performing an OR operation on the results of the XOR operation.

5. The computer-implemented method of claim 1, further comprising:
   in response to defining the first chunk of data as a pattern, reducing the size of the first chunk of data to a predefined metadata size.

6. The computer-implemented method of claim 1, further comprising:
   storing a representation of the user data page using the pattern.

7. The computer-implemented method of claim 6, further comprising:
   receiving a read request for the user data page;
   reconstructing the user data page using the stored representation of the user data page; and
   providing the reconstructed user data page in response to the read request.

8. A computer program product residing on a non-transitory computer readable medium having a plurality of instructions stored thereon which, when executed by a processor, cause the processor to perform operations comprising:
   loading a first chunk of data from a user data page into a first buffer;
   iteratively loading each successive chunk of data from the user data page into a second buffer;
   iteratively comparing the first chunk of data in the first buffer with each successive chunk of data in the second buffer; and
   in response to determining that the first chunk of data in the first buffer is equivalent to each successive chunk of data in the second buffer, defining the first chunk of data as a pattern.

9. The computer program product of claim 8, wherein the second buffer is configured to perform a hash calculation on the successive chunk of data.

10. The computer program product of claim 8, wherein iteratively comparing the first chunk of data in the first buffer with the successive chunk of data in the second buffer includes performing an XOR operation on the first chunk of data in the first buffer and the successive chunk of data in the second buffer.

11. The computer program product of claim 10, wherein iteratively comparing the first chunk of data in the first buffer with the successive chunk of data in the second buffer includes performing an OR operation on the results of the XOR operation.

12. The computer program product of claim 8, wherein the operations further comprise:
in response to defining the first chunk of data as a pattern, reducing the size of the first chunk of data to a predefined metadata size.

13. The computer program product of claim 8, wherein the operations further comprise:
storing a representation of the user data page using the pattern.

14. The computer program product of claim 13, wherein the operations further comprise:
receiving a read request for the user data page;
reconstructing the user data page using the stored representation of the user data page; and
providing the reconstructed user data page in response to the read request.

15. A computing system comprising:
a memory; and
a processor configured to load a first chunk of data from a user data page into a first buffer, wherein the processor is further configured to iteratively load each successive chunk of data from the user data page into a second buffer, wherein the processor is further configured to iteratively compare the first chunk of data in the first buffer with each successive chunk of data in the second buffer, and wherein the processor is further configured to, in response to determining that the first chunk of data in the first buffer is equivalent to each successive chunk of data in the second buffer, define the first chunk of data as a pattern.

16. The computing system of claim 15, wherein the second buffer is configured to perform a hash calculation on the successive chunk of data.

17. The computing system of claim 15, wherein iteratively comparing the first chunk of data in the first buffer with the successive chunk of data in the second buffer includes performing an XOR operation on the first chunk of data in the first buffer and the successive chunk of data in the second buffer.

18. The computing system of claim 17, wherein iteratively comparing the first chunk of data in the first buffer with the successive chunk of data in the second buffer includes performing an OR operation on the results of the XOR operation.

19. The computing system of claim 15, wherein the processor is further configured to:
in response to defining the first chunk of data as a pattern, reduce the size of the first chunk of data to a predefined metadata size.

20. The computing system of claim 15, wherein the processor is further configured to:
store a representation of the user data page using the pattern.

* * * * *